US010009893B2

(12) United States Patent
Wang et al.

(10) Patent No.: US 10,009,893 B2
(45) Date of Patent: Jun. 26, 2018

(54) DATA TRANSMISSION SCHEDULING METHOD, A DATA SCHEDULING DEVICE AND A DATA TRANSMISSION SCHEDULING SYSTEM

(71) Applicant: ZTE Corporation, Shenzhen (CN)

(72) Inventors: Bo Wang, Shenzhen (CN); He Huang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days. days.

(21) Appl. No.: 15/021,004

(22) PCT Filed: Jun. 3, 2014

(86) PCT No.: PCT/CN2014/079050
§ 371 (c)(1),
(2) Date: Mar. 10, 2016

(87) PCT Pub. No.: WO2014/177103
PCT Pub. Date: Nov. 6, 2014

(65) Prior Publication Data
US 2016/0249351 A1 Aug. 25, 2016

(30) Foreign Application Priority Data
Sep. 11, 2013 (CN) .......................... 2013 1 0413868

(51) Int. Cl.
*H04W 72/04* (2009.01)
*H04W 72/12* (2009.01)
(Continued)

(52) U.S. Cl.
CPC ....... *H04W 72/0446* (2013.01); *H04L 5/0055* (2013.01); *H04W 4/06* (2013.01);
(Continued)

(58) Field of Classification Search
None
See application file for complete search history.

(56) References Cited

U.S. PATENT DOCUMENTS

| 7,697,560 B2 | 4/2010 | Yamauchi et al. | |
| 8,599,705 B2 * | 12/2013 | Agrawal | H04W 72/082 370/252 |

(Continued)

FOREIGN PATENT DOCUMENTS

CN 103139821 A 6/2013

OTHER PUBLICATIONS

PCT International Search Report for PCT/CN2014/079050 dated Sep. 1, 2014 (5 pages).
(Continued)

*Primary Examiner* — Anh Ngoc Nguyen
(74) *Attorney, Agent, or Firm* — Eversheds Sutherland (US) LLP

(57) ABSTRACT

A data transmission scheduling method, device and system are disclosed, which relates to the field of wireless communications, and solves the problem of low network utilization rate in the related scheduling modes. The method includes: receiving a measurement report sent by an access point (AP), wherein the measurement report carries a transmission power of the AP sending the measurement report, and signal reception levels and powers of surrounding devices of the AP; according to the measurement report, evaluating interference relationships between the AP and the surrounding devices of the AP, and obtaining an evaluation result; and making a scheduling decision according to the evaluation result. The technical scheme provided in the embodiments of the present document is applicable to a WLAN, which implements parallel communication of a plurality of low-interference terminals.

20 Claims, 9 Drawing Sheets

(51) Int. Cl.
- *H04L 5/00* (2006.01)
- *H04W 4/06* (2009.01)
- *H04W 24/10* (2009.01)
- *H04W 72/08* (2009.01)
- *H04L 1/18* (2006.01)

(52) U.S. Cl.
CPC ......... *H04W 24/10* (2013.01); *H04W 72/042* (2013.01); *H04W 72/082* (2013.01); *H04W 72/085* (2013.01); *H04W 72/1231* (2013.01); *H04L 1/1887* (2013.01)

(56) References Cited

U.S. PATENT DOCUMENTS

| | | | |
|---|---|---|---|
| 8,693,316 B2 | 4/2014 | Palanki et al. | |
| 8,903,448 B2* | 12/2014 | Chande | H04W 52/143 370/318 |
| 9,002,397 B2* | 4/2015 | Zhou | H04W 52/146 455/440 |
| 2005/0190731 A1 | 9/2005 | Bejerano et al. | |
| 2007/0263587 A1 | 11/2007 | Savoor et al. | |
| 2009/0080499 A1 | 3/2009 | Yavuz et al. | |
| 2010/0080183 A1 | 4/2010 | Mishra et al. | |
| 2010/0248730 A1 | 9/2010 | Han et al. | |
| 2011/0211560 A1 | 9/2011 | Yamamoto et al. | |
| 2013/0095811 A1* | 4/2013 | Okino | H04W 52/0206 455/418 |
| 2013/0258890 A1 | 10/2013 | Li et al. | |

OTHER PUBLICATIONS

Supplemental European Search Report for EP Application No. 14792213 dated Jul. 22, 2016 (13 pages).

Arslan et al., "FERMI: A FEmtocell Resource Management System for Interference Mitigation in OFDMA Networks," Proceedings of the 17th Annual International Conference on Mobile Computing and Networking, Mobicom, 2011.

\* cited by examiner

DATA TRANSMISSION SCHEDULING METHOD, A DATA SCHEDULING DEVICE AND A DATA TRANSMISSION SCHEDULING SYSTEM

CROSS REFERENCES TO RELATED APPLICATIONS

This application claims the priority benefit of PCT/CN2014/079050 filed on Jun. 3, 2014 and Chinese Application No. 201310413868.X filed on Sep. 11, 2013. The contents of these applications are hereby incorporated by reference in their entirety.

TECHNICAL FIELD

The present document relates to the field of data transmission scheduling, and particularly, to a data transmission scheduling method, device and system.

BACKGROUND

With the increasing development of the wireless network technology in recent years, the Wireless Local Area Network (WLAN) technology which can provide wireless connection services of the local area network attracts more and more attention from the industry. The wireless local area network has advantages of low cost, flexible networking and high rate and so on, it is widely applied in different fields such as enterprise and education and so on, and it is used by the telecom service operators for providing common wireless access services in "hotspot" areas.

The WLAN system follows a series of technical standards such as the 802.11 a/b/g/n defined by the Institute of Electrical and Electronic Engineers (IEEE) 802.11 working group. In the specification 802.11, a Carrier Sense Multiple Access with Collision Avoidance (CSMA/CA) mechanism is used in the media access control protocol, to make a plurality of clients share a wireless channel. In accordance with the CSMA/CA mechanism, before sending data, one wireless device will detect an idle state of the channel, if it is discovered that related other devices are transmitting data, the wireless device does not send the data, and randomly rolls back for a period of time until the channel is idle, and if the channel is still idle at this point, it sends the data. Even though the implementation is simple, the flexibility is high and the occurrence of collision can be avoided to a certain extent in such channel competition way, the following disadvantages still exist:

1. The "Hidden terminal" problem cannot be effectively solved, that is, when two terminals cannot mutually sense a signal of the opposite party, if one of the terminals sends data, the other terminal will mistakenly think that the current channel is idle for the signal of the terminal cannot be sensed, thus it also sends the data, which causes the wireless signal collision and data retransmission. Though the 802.11 protocol proposes the request to send/clear to send (RTS/CTS) exchange protocol to solve the problem, it can only solve the hiding of the sending terminal, but cannot solve the hiding of the receiving terminal (that is, an error still exists in receiving when the terminal is hidden) and a case of collision of the RTS/CTS information package itself, and the network overhead is increased.

2. The channel utilization rate is low. After one device occupies the channel, other devices can only be in a waiting state, even though they are within a coverage scope of the device and outside a coverage scope of the receiving node, no influence will be caused on communications of the device ("exposed terminal").

3. The network capacity is limited by the number of devices. When the number of the devices is larger and the distribution is denser, the wireless interferences between the devices are more serious, thus the network cannot accommodate excessive users, and the networking scale is limited.

In conclusion, the network utilization rate is low in the related scheduling modes.

SUMMARY

The embodiments of the present document provide a data transmission scheduling method, device and system, solving the problem of low network utilization rate in the related scheduling modes.

A data transmission scheduling method comprises:
  receiving a measurement report sent by an access point (AP), wherein the measurement report carries a transmission power of the AP sending the measurement report, and signal reception levels and powers of surrounding devices of the AP;
  evaluating interference relationships between the AP and the surrounding devices of the AP according to the measurement report, and obtaining an evaluation result; and
  making a scheduling decision according to the evaluation result.

Alternatively, the step of evaluating interference relationships between the AP and the surrounding devices of the AP according to the measurement report comprises:
  according to the measurement report, calculating path loss data between the APs;
  establishing path loss data between an AP and a client accessing under the AP; and
  evaluating interference relationships between all devices in one communication pair and all devices in another communication pair according to the path loss data between the APs and the path loss data between the AP and the client accessing under the AP;
  wherein, the communication pair is composed of communications between the AP and the client accessing under the AP.

Alternatively, when only two communication pairs exist, a first AP and a first client form one communication pair, a second AP and a second client form the other communication pair, the step of evaluating interference relationships between all devices in one communication pair and all devices in another communication pair according to the path loss data between the APs and the path loss data between the AP and the client accessing under the AP comprises:
  calculating an interference value RSSI_aa12 from the first AP to the second AP according to an expression below:

$RSSI\_aa12 = TxPower_{AP_1} - PathLoss_{AP_1AP_2}$, wherein, $TxPower_{AP_1}$ is a transmission power of the first AP, and $PathLoss_{AP_1AP_2}$ is path loss data between the first AP and the second AP;
  calculating an interference value RSSI_as12 from the first AP to the second client according to an expression below:

$RSSI\_as12 = TxPower_{AP_1} - PathLoss_{AP_1STA_2}$, wherein, $PathLoss_{AP_1STA_2}$ is path loss data between the first AP and the second client;

calculating an interference value RSSI_sa12 from the first client to the second AP according to an expression below:

$$RSSI\_sa12 = TxPower_{STA_1} - PathLoss_{AP_2STA_1},$$

wherein, $TxPower_{STA_1}$ is a transmission power of the first client, $PathLoss_{AP_2STA_1}$ is path loss between the second AP and the first client;

comparing the RSSI_aa12, RSSI_as12 and RSSI_sa12 with a threshold value when interfered preset for the second AP and the second client; and when the RSSI_aa12, RSSI_as12 and/or the RSSI_sa12 exceeds the threshold value when interfered, determining that an interference exists.

Alternatively, when three or more than three communication pairs exist, a first AP and a first client form a first communication pair, the step of evaluating interference relationships between all devices in one communication pair and all devices in another communication pair according to the path loss data between the APs and the path loss data between the AP and the client accessing under the AP comprises:

respectively evaluating interference relationships between various communication pairs containing a neighboring AP of the first AP and the first communication pair; and performing accumulation on the interference relationships of the various communication pairs containing the neighboring AP with the first communication pair, and obtaining a total interference of all communication pairs containing the neighboring AP with the first communication pair.

Alternatively, the step of making a scheduling decision according to the evaluation result comprises:

when two communication pairs request for simultaneously transmitting downlink data packets, judging whether the following four conditions are met, when the following four conditions are simultaneously met, determining that the two communication pairs can simultaneously transmit the downlink data packets:

when the first AP sends data to the first client, the second AP and the second client cannot interfere with the first client;

when the second AP and the second client interfere with the first AP, the interference is stopped before the first client sends downlink data ACK;

when the second AP sends data to the second client, the first AP and the first client cannot interfere with the second client; and when the first AP and the first client interfere with the second AP, the interference is stopped before the second client sends the ACK.

Alternatively, the step of making a scheduling decision according to the evaluation result comprises:

when three or more than three communication pairs request for simultaneously transmitting downlink data packets, judging whether the following two conditions are met, when the following two conditions are simultaneously met, determining that the three or more than three communication pairs can simultaneously transmit the downlink data packets:

an interference of any communication pair with another communication pair is less than a set threshold; and an interference with any communication pair is less than a set threshold.

Alternatively, the step of making a scheduling decision according to the evaluation result comprises:

dividing time resource of a time interval of a management frame Beacon frame of at least one AP into a plurality of time slices;

orderly allocating different time slices for each AP according to a sequence from large to small of sums of interferences from each AP with other APs and interferences from other APs with each AP, not allocating a same time slice to APs between which the interference exists, and allocating a plurality of APs between which no interference exists in a same time slice.

Alternatively, when time slices are allocated to the APs between which the interference exists, time slices are preferentially allocated to an AP with a higher priority.

Alternatively, the method further comprises:
configuring a priority for each AP in a network.

Alternatively, after the step of making a scheduling decision according to the evaluation result, the method further comprises:

outputting scheduling decision information, wherein the scheduling decision information contains bitmap information of time slices of each AP, indicating each AP to compete for a channel in allocated time slices, and after the channel is obtained by competition, filling downlink data into a buffer of a physical layer.

Alternatively, the step of making a scheduling decision according to the evaluation result comprises:

dividing time resource of a time interval of a Beacon frame of at least one AP into a plurality of time slices;

each AP allocating n/M time slices for each associated client under the AP, wherein a principle for allocating the time slices comprises: the client being a client with a minimum sum of an interference with another client and an interference from another client on the time slices, wherein, M represents a number of associated clients of the AP, and n represents a number of time slices, wherein, M and n are positive integers.

Alternatively, after the step of making a scheduling decision according to the evaluation result, the method further comprises:

outputting scheduling decision information, wherein the scheduling decision information contains bitmap information of the time slices of each associated client under each AP, indicating the AP to compete for a physical channel; and after the AP obtains the physical channel by competition, filling downlink data of which a destination address is a corresponding client of time slices into a buffer of a physical layer.

Alternatively, the step of receiving a measurement report sent by an AP comprises:

an access controller AC receiving a measurement report of the AP sent by each AP.

Alternatively, the step of receiving a measurement report sent by an AP comprises:

the AP receiving measurement reports of other various APs except the AP broadcasted by the other various APs.

Alternatively, the method further comprises:
the AP recording received data packet signal levels of various clients and/or a neighboring AP.

Alternatively, the method further comprises:
the AP broadcasting a measurement report of the AP itself, wherein, the measurement report carries a transmission power of the first AP sending the measurement report, and signal reception levels and powers of surrounding devices of the AP.

The embodiment of the present document further provides a data scheduling device, which comprises: a measurement report collection module, an interference evaluation module and a scheduling decision module, wherein, the measurement report collection module is configured to: receive a measurement report sent by an access point (AP), wherein the measurement report carries a transmission power of the AP sending the measurement report, and signal reception levels and powers of surrounding devices of the AP;

the interference evaluation module is configured to: according to the measurement report, evaluate interference relationships between the AP and the surrounding devices of the AP, and obtain an evaluation result; and the scheduling decision module is configured to: make a scheduling decision according to the evaluation result.

Alternatively, the interference evaluation module comprises:

a first path loss calculation unit, configured to: calculate path loss data between the APs;

a second path loss calculation unit, configured to: establish path loss data between an AP and a client accessing under the AP; and an interference evaluation unit, configured to: according to the path loss data between the APs and the path loss data between the AP and the client accessing under the AP, evaluate interference relationships between all devices in one communication pair and all devices in another communication pair;

wherein, the communication pair is composed of communications between the AP and the client accessing under the AP.

Alternatively, the device further comprises:

a result output module, configured to: output scheduling decision information, wherein the scheduling decision information contains bitmap information of time slices of each AP, indicate each AP to compete for a channel in allocated time slices, and after the channel is obtained by competition, fill downlink data into a buffer of a physical layer.

The embodiment of the present document further provides a data transmission scheduling system, which comprises a data transmission scheduling device and at least one access point (AP);

the data transmission scheduling device is configured to: receive a measurement report sent by the AP, wherein the measurement report carries a transmission power of the AP itself sending the measurement report, and signal reception levels and powers of surrounding devices of the AP, according to the measurement report, evaluate interference relationships between the AP and the surrounding devices of the AP, obtain an evaluation result, and make a scheduling decision according to the evaluation result.

Alternatively, the data transmission scheduling device is further configured to: output scheduling decision information, wherein the scheduling decision information contains bitmap information of time slices of each AP, indicate each AP to compete for a channel in allocated time slices, and after the channel is obtained by competition, fill downlink data into a buffer of a physical layer.

Alternatively, the AP is configured to: send the measurement report of the AP to the data transmission scheduling device, or, broadcast the measurement report of the AP.

Alternatively, the AP is further configured to: record received data packet signal levels of various clients and/or a neighboring AP.

The embodiments of the present document provide a data transmission scheduling method, device and system, the data transmission scheduling device receives a measurement report sent by an AP, wherein the measurement report carries a transmission power of the AP itself sending the measurement report, and signal reception levels and powers of surrounding devices of the AP, then according to the measurement report, evaluates interference relationships between the devices, and makes a scheduling decision according to an evaluation result of the interference relationship, which implements parallel communications of a plurality of low-interference terminals, and solves the problem of low network utilization rate in the related scheduling modes.

PREFERRED EMBODIMENTS OF THE INVENTION

Figure 1:
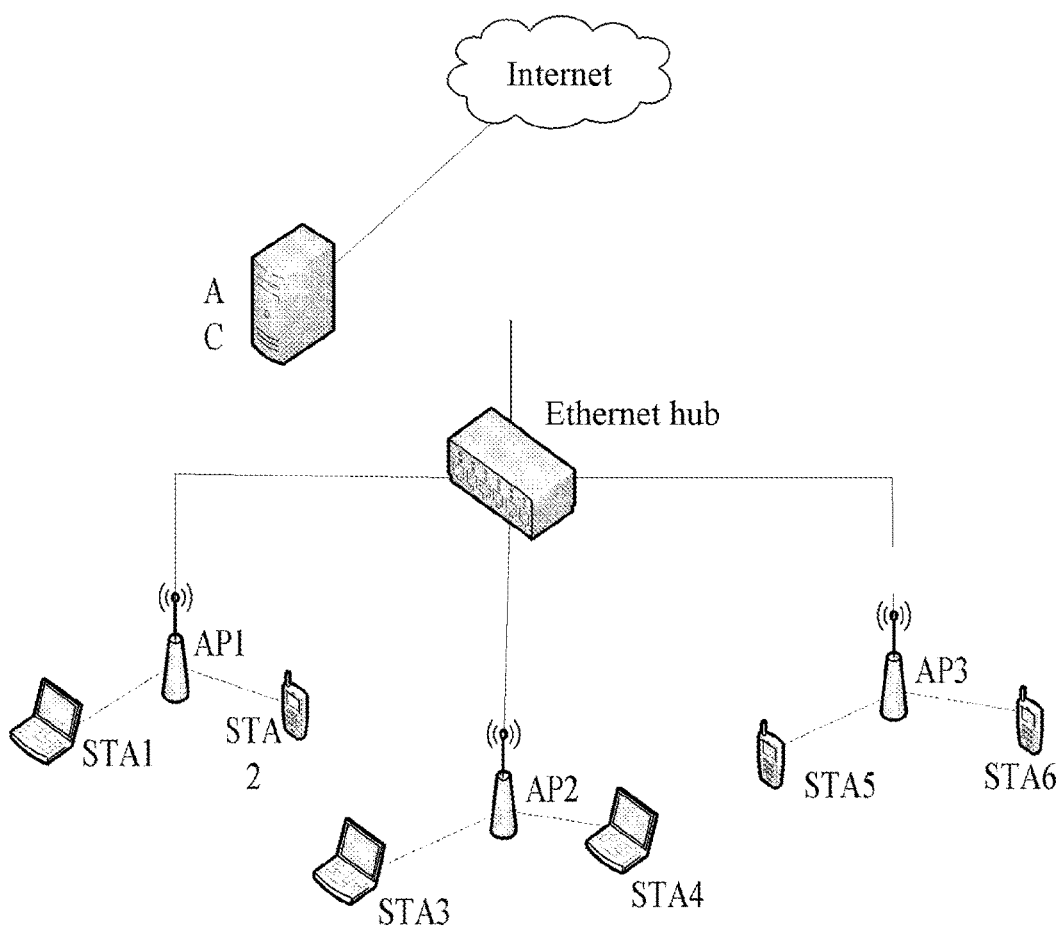
FIG. 1 is a schematic diagram of a centralized network structure.

In order to solve the problem of low network utilization rate in the related scheduling modes, the embodiments of the present document provide a data transmission scheduling method, device and system.

The embodiments of the present document will be described in detail in combination with the accompanying drawings below. It should be noted that the embodiments in the present document and the characteristics in the embodiments can be arbitrarily combined with each other in the case of no conflict.

Firstly the embodiment 1 of the present document will be described in combination with the accompanying drawings.

The embodiment of the present document provides a data transmission scheduling method, which aims at solving the problems such as low channel utilization efficiency and bandwidth loss and so on caused when the devices in the wireless local area network compete for channels. When the interferences among the devices are at a sustainable degree, through the coordination, a plurality of transmitting ends actively initiate communications, thus the purpose of parallel communication is achieved.

Implementing the data transmission scheduling with the data transmission scheduling method provided in the embodiment of the present document mainly includes the following three aspects:

1. A measurement report sent by an AP is received, and the measurement report carries a transmission power of the AP sending the measurement report, and signal reception levels and powers of surrounding devices of the AP;

in the embodiment of the present document, each AP records received signal levels of other network devices (including neighboring access points, associated clients and non-associated clients), and periodically notifies other access points or central control nodes of signal reception levels of other network devices recorded by the AP itself and power information of the AP; if the deployed WLAN system supports the 802.11k, a Client (station, STA) is also required to record signal level values of other network devices and report the signal level values to an associated AP, and the AP notifies other APs or central control nodes (ACs).

2. According to the measurement report, interference relationships between the AP and the surrounding devices of the AP are evaluated, and an evaluation result is obtained;

in the step, according to the collected signal levels and power information reported by other APs, the AP or AC calculates the path losses between various devices (the path losses between the devices may also be obtained in other ways, such as measurement), and evaluates interference relationships between various communication pairs (AP-STA) based on the information.

3. A scheduling decision is made according to the evaluation result of the interference relationships;

in the step, according to the evaluated interference relationships between the communication pairs, scheduling is performed by all the APs in the distributed model (or by a center node in the centralized model), and no interference exists or the interference is smaller between communication pairs in simultaneous transmission in principle. For successfully scheduling, the APs of the entire network are required to implement synchronization by a certain kind of means, such as based on the GPS, or Ethernet protocols (NTP and IEEE 1588, etc.).

For the ordinary people skilled in the art to conveniently execute and understand the present document, the present document will be described in detail in combination with the accompanying drawings and through the embodiments below, and the following descriptions are only exemplary, which are not used to limit the scope of the present document and the application of the present document.

Figure 2:
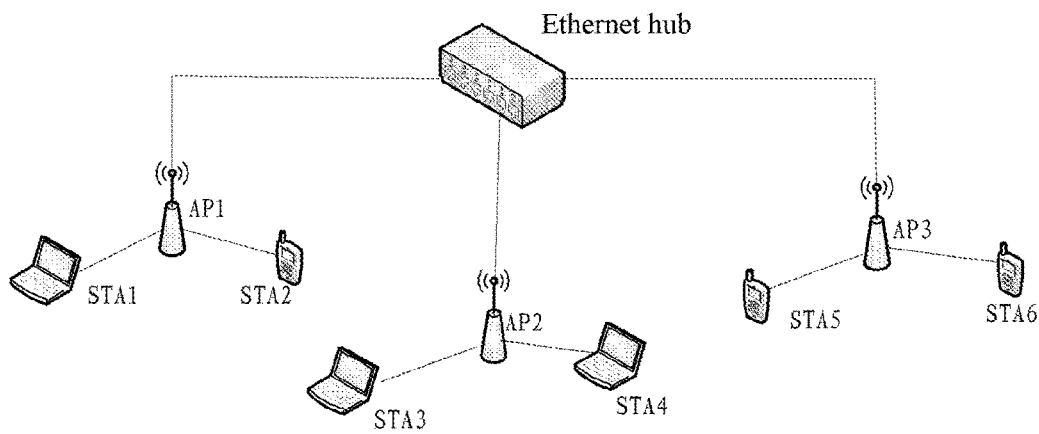
FIG. 2 is a schematic diagram of a distributed network structure.

FIG. 1 and FIG. 2 are diagrams of network structures of the centralized scheduling in the wireless local area network involved in the embodiments of the present document. Wherein the centralized architecture is used in FIG. 1, and the distributed architecture is used in FIG. 2. The former is similar to the latter in including six clients (STA1~6) and three access points AP1~3 configured to perform data communications with the six clients, except the former further includes one Access Controller (AC) which performs management configuration on the APs. In the centralized architecture, the AC is responsible for performing scheduling on the network; and in the distributed architecture, each AP autonomously selects a sending opportunity. In a typical case, the client includes a calculating device, such as a desktop, portable or handheld device. The AC can be a software entity in the AP, or a part of a separate physical device, switch or router, or a part of a miniaturized AC. The AP can be one of the fat AP, thin AP or ultra-thin AP. The access points and the clients perform communications according to any kind of standards in the IEEE 802.11 protocol family and follow the 802.11 medium access control (MAC) layer specifications. However, the principle of the embodiments of the present document is not limited to the 802.11 standard, and it also can be applied to almost any type of WLANs, including a HiPerLAN, a Bluetooth and systems based on the HISWAN.

Figure 3:
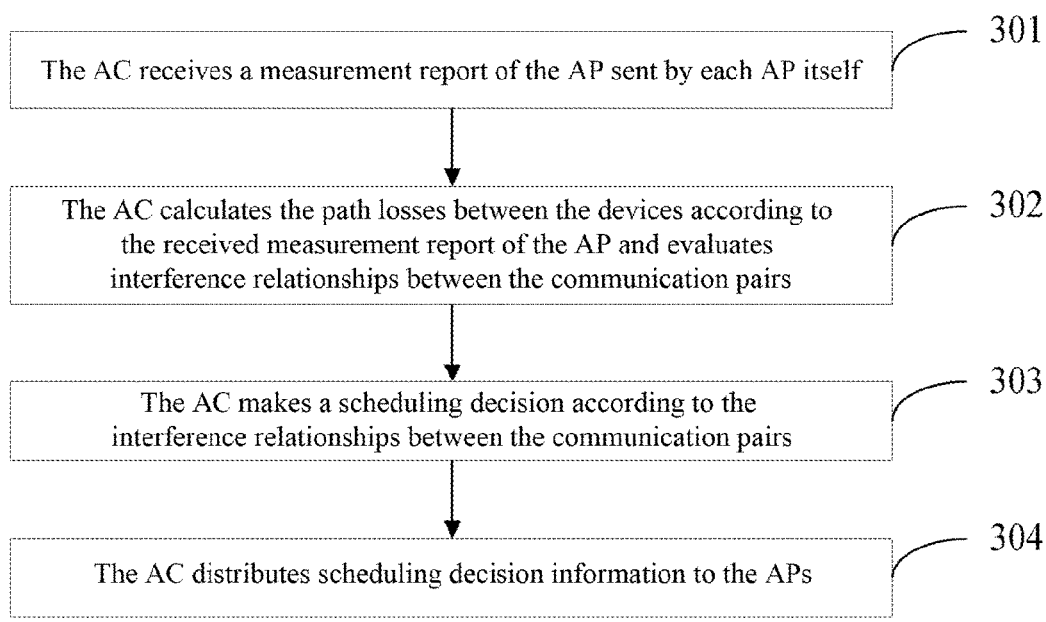
FIG. 3 is a processing flow chart of an AC in the embodiment 1 of the present document.

FIG. 3 describes a processing flow of the AC in the centralized scheduling of the centralized architecture proposed in the embodiment of the present document, and the following specific steps are included:

in step 301, the AC receives a measurement report of the AP sent by each AP itself;

in the step, the AC periodically receives the measurement report sent by the AP according to the measurement report, the AP can initiatively sends the measurement report, and it also can send the measurement report after the AC sends a measurement report request, the measurement report contains a transmission power of the AP, and signal reception levels and powers of surrounding devices, and it can send through a wired network or an air interface;

in step 302, the AC calculates the path losses between the devices according to the received measurement report of the AP and evaluates interference relationships between the communication pairs, wherein, the communication pair is composed of communications between the AP and the client accessing under the AP;

in step 303, the AC makes a scheduling decision according to the interference relationships between the communication pairs.

in step 304, the AC distributes scheduling decision information to the APs, and the information can be distributed through the air interface or the wired network.

Figure 4:
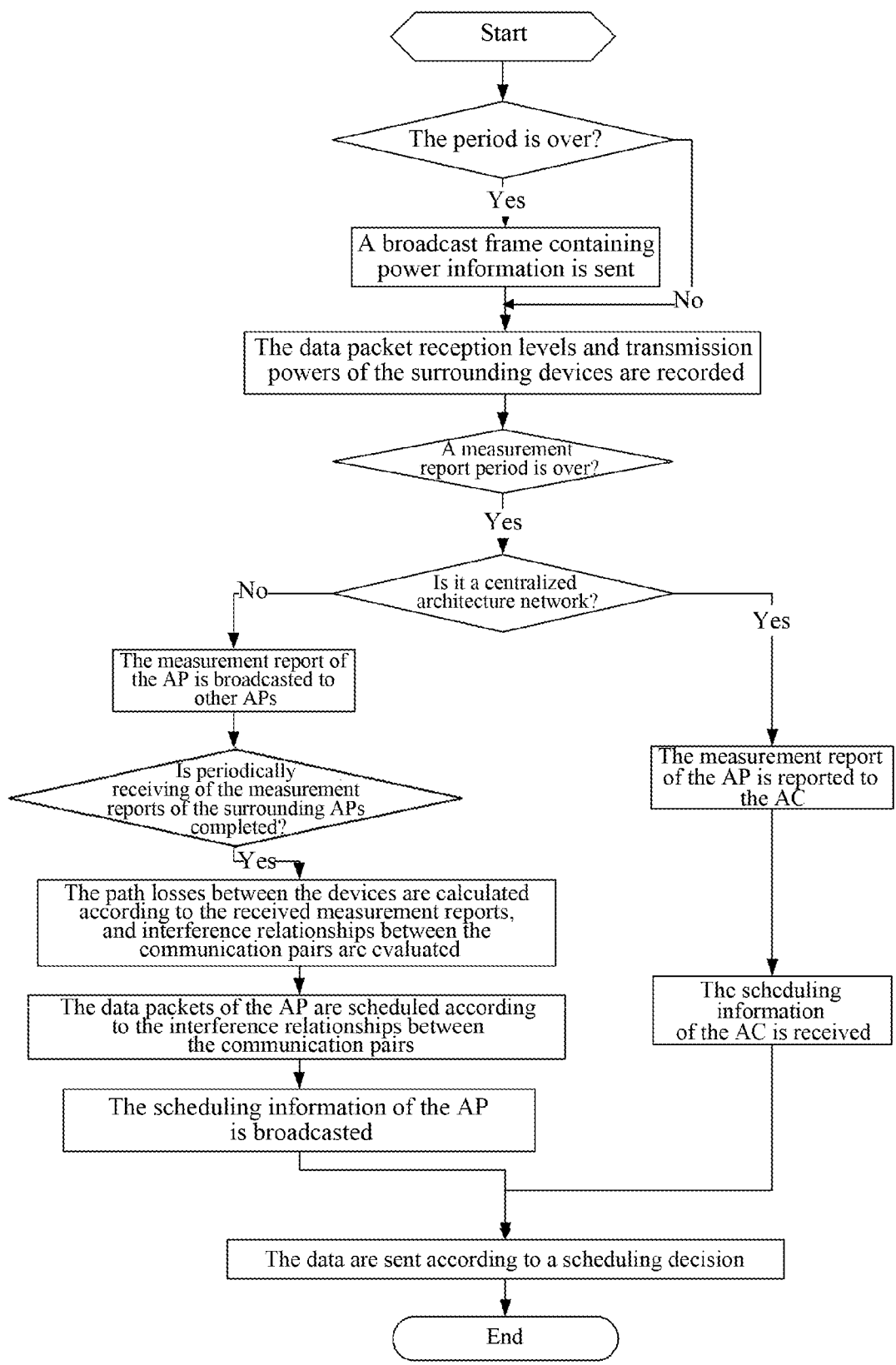
FIG. 4 is a processing flow chart of an AP in the embodiment 1 of the present document.

FIG. 4 describes a processing flow of the AP proposed in the embodiment of the present document, and the following steps are included:

1. Each AP broadcasts its own measurement report, and the measurement report includes the transmission power of the first AP itself sending the measurement report, and signal reception levels and powers of surrounding devices of the AP. Correspondingly, each AP sends the measurement report by periodically sending a centralized scheduling AP measurement related broadcast frame containing the power information, and the broadcast frame is used for measuring the path loss from the AP to a receiver of the broadcast frame, and the broadcast frame can be a 802.11 standard related management frame such as a Beacon frame and a Probe Request frame and so on, and it also can use a frame format self-defined by the nonstandard manufacturers. The AP records the received data packet signal levels of various clients and/or neighboring APs.

2. The AP records the data packet reception levels and transmission powers of the surrounding devices, the transmission power of the AP is directly read from the centralized scheduling AP measurement related broadcast frame, and the transmission power of the STA is estimated according to the client type, generally the mobile phone is of 17 dBm, and the portable computer is of 20 dBm.

3. In the centralized architecture, the measurement report of the AP is sent to the AC after the measurement report period is over; and in the distributed architecture, the measurement report of the AP is broadcasted after the measurement report period is over. The measurement report contains the transmission power of the AP, and signal reception levels and powers of the surrounding devices, and it can be sent through the wired network or the air interface.

4. In the centralized architecture, scheduling decision information of the AC is received; in the distributed architecture, the AP firstly calculates the path losses between the devices according to the received measurement reports of other APs, evaluates interference relationships between the communication pairs, then makes a scheduling decision on the data packet transmission, and finally broadcasts its own scheduling decision information.

5. The AP schedules the data packets according to a scheduling decision result.

Figure 5:
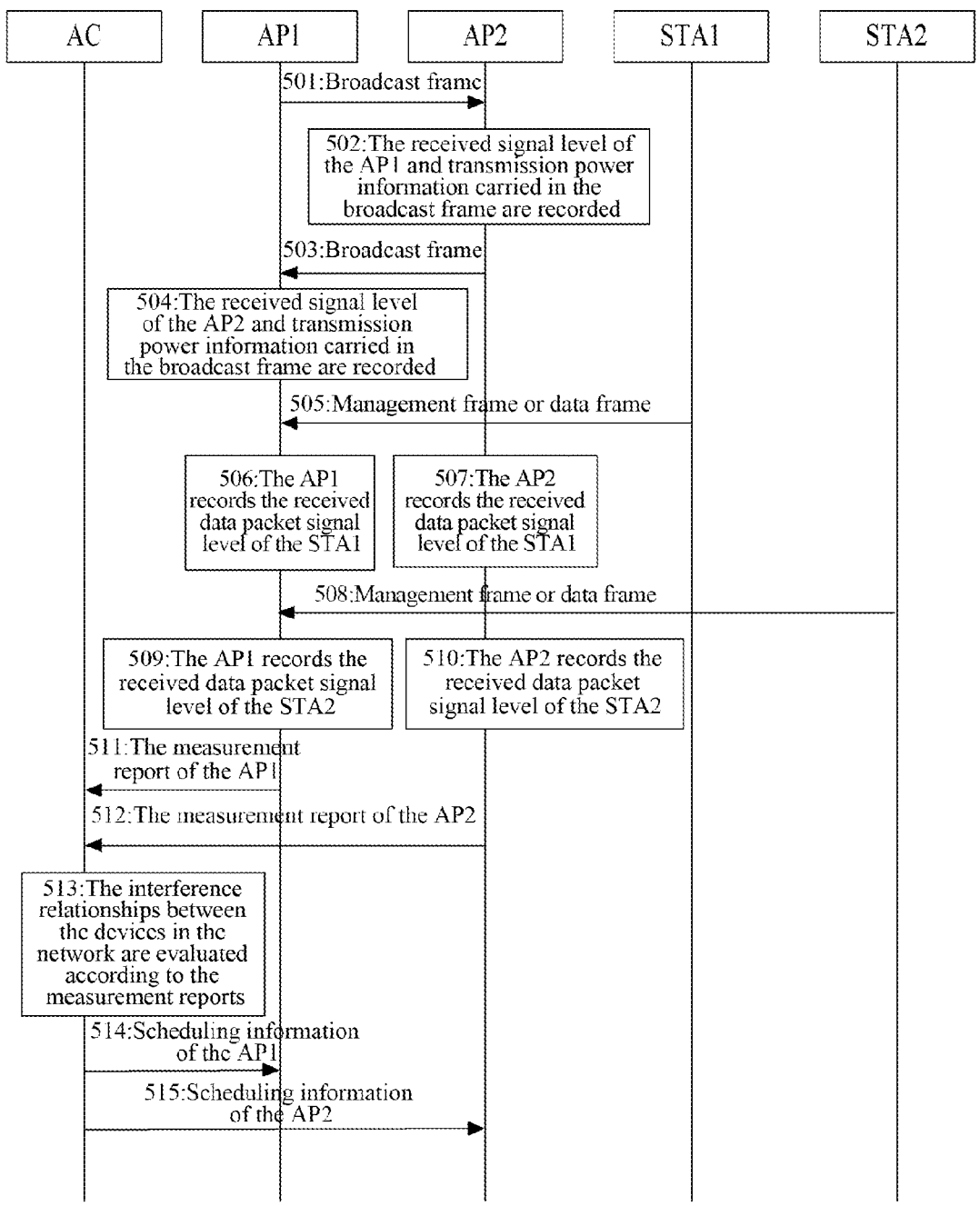
FIG. 5 is a flow chart of signaling interaction of the centralized scheduling in the centralized model in the embodiment 1 of the present document.
Figure 6:
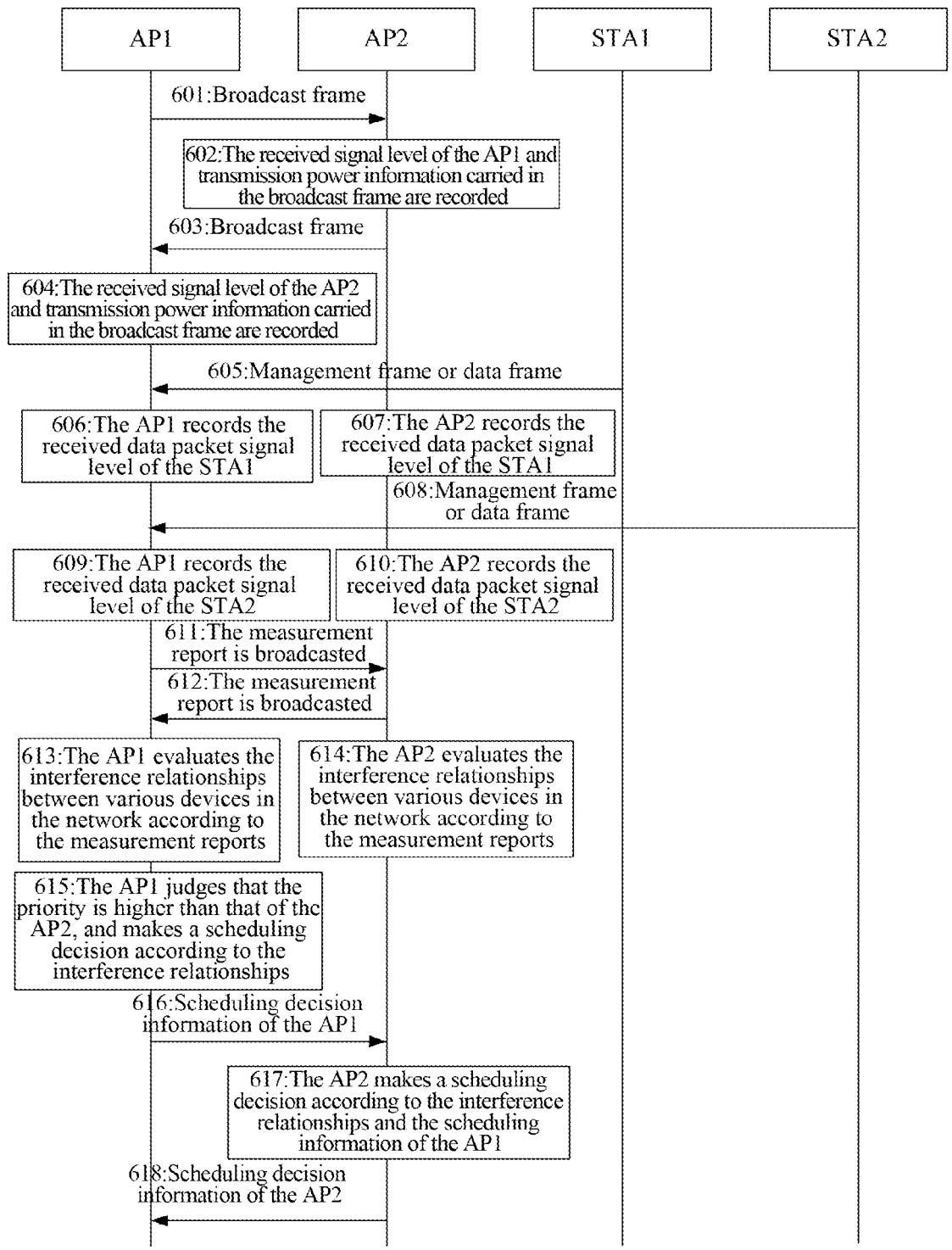
FIG. 6 is a flow chart of signaling interaction of the centralized scheduling in the distributed model in the embodiment 1 of the present document.

FIG. 5 describes a flow of signaling interaction of the centralized scheduling in the centralized model proposed in the embodiment of the present document, and the corresponding steps are included:

in step 501, an AP1 periodically sends a centralized scheduling measurement broadcast frame with the maximum power, the broadcast frame carries the current transmission power information of the AP1, the broadcast frame can be a 802.11 standard related management frame such as a Beacon frame and a Probe Request frame and so on, and it also can use a frame format self-defined by the nonstandard manufacturers;

in step 502, an AP2 records a signal level of the received centralized scheduling measurement broadcast frame of the AP1 and the power information contained in the broadcast frame;

in step 503, accordingly the AP2 also periodically sends a centralized scheduling measurement broadcast frame containing its own transmission power;

in step 504, the AP1 records a signal level and power information of the AP2;

in step 505, an STA1 sends a data frame after completing the association and authentication according to the 802.11 protocol;

in step 506, the AP1 records the received data packet signal level of the STA1;

in step 507, the AP2 records the received data packet signal level of the STA1;

in step 508, an STA2 sends a data frame after completing the association and authentication according to the 802.11 protocol;

in step 509, the AP1 records the received data packet signal level of the STA2;

in step 510, the AP2 records the received data packet signal level of the STA2;

in step 511, the AP1 sends its own measurement report to an AC, and it can send the measurement report through a wired network or a wireless air interface;

in step 512, the AP2 sends its own measurement report to the AC;

in step 513, the AC evaluates interference relationships between the devices according to the measurement reports of the APs;

in step 514, the AC sends scheduling decision information to the AP1;

in step 515, the AC sends scheduling decision information to the AP2;

FIG. 6 describes a flow of signaling interaction of the centralized scheduling in the distributed model proposed in the embodiment of the present document, and the corresponding steps are included:

in steps 601~610, these steps are identical with the steps 501~510, which will not be repeated;

in step 611, the AP1 broadcasts its own measurement report, the measurement report contains the transmission power of the AP1, and signal reception levels and powers of the surrounding devices, and it can send through the wired network or the air interface;

in step 612, the AP2 broadcasts its own measurement report;

in step 613, the AP1 evaluates interference relationships between various devices in the network according to the measurement report;

in step 614, the AP2 evaluates interference relationships between various devices in the network according to the measurement report;

in step 615, the AP1 judges that the priority is higher than that of the AP2, and makes a scheduling decision according to the interference relationships between the devices, and the priority of the AP can be configured through the network or determined according to the interference size of the AP;

in step 616, after finishing the scheduling decision, the AP1 sends the scheduling decision related information thereof (such as a data packet transmission time and so on) to the AP2;

in step 617, the AP2 makes a scheduling decision according to the interference relationships and the scheduling information of the AP1;

in step 618, the AP2 sends its own scheduling decision information to the AP1.

The data transmission scheduling proposed in the embodiments of the present document is established based on the interference evaluation between the devices, and the interference evaluation mechanism of the present document will be further elaborated in combination with the specific embodiments below.

The embodiment 2 of the present document will be described in combination with the accompanying drawings.

The embodiment of the present document provides a data transmission scheduling method, with this method, when the data scheduling is performed, firstly a measurement report sent by an AP is received, the measurement report carries the transmission power of the AP sending the measurement report, and signal reception levels and powers of surrounding devices of the AP, then according to the measurement report, interference relationships between the AP and the surrounding devices of the AP are evaluated, an evaluation result is obtained, and a scheduling decision is made according to the evaluation result of the interference relationships. For details, it may refer to the embodiment 1 of the present document.

When the interference evaluation is performed, firstly path loss data between the APs are calculated, then path loss data between the AP and the clients accessing under the AP are established, and finally according to the path loss data between the APs and the path loss data between the AP and the client accessing under the AP, the interference relationships between all devices in one communication pair and all devices in another communication pair are evaluated. According to the difference of the number of communication pairs required to be considered, the evaluation ways are also different, and the specific descriptions are as follows.

In the embodiment of the present document, it is to focus on the interference evaluation way with regard to two communication pairs.

Figure 7:
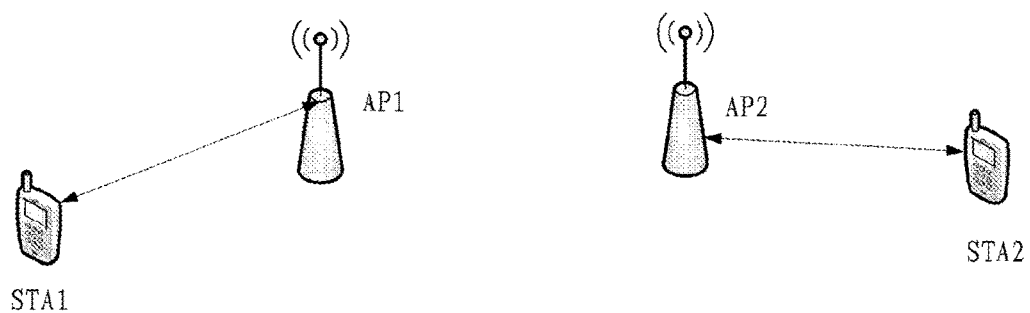
FIG. 7 is a schematic diagram of a network structure containing two AP-STA communication pairs.

When only two communication pairs exist, a first AP and a first client form one communication pair, a second AP and a second client form another communication pair. As shown in FIG. 7, four devices, i.e. an AP1 (serving as the first AP), an AP2 (serving as the second AP), an STA1 (serving as the first client) and an STA2 (serving as the second client), form two communication pairs, AP1-STA1 and AP2-STA2, in order to judge whether they can transmit simultaneously, it is required to determine the interference relationships between the devices. The system firstly collects the path loss data between various devices, which includes:

1. Path loss data between the APs are established:
the AP is required to record a Received Signal Strength Indication (RSSI) value of a centralized scheduling broadcast frame sent by the neighboring AP and the transmission power of the neighboring AP contained in the broadcast frame, then the path loss between the APs is estimated (it is calculated by the AC in the centralized architecture), for example, the path loss from the AP2 to the AP1 is equal to the transmission power of the AP2 minus the data packet reception level of the AP2 recoded by the AP1 in the embodiment of the present document.

2. Path loss data between the AP and the STA are established:
the AP monitors data packets of the air interface, records {an RSSI value, an MAC address of the sending party, an associated AP address of the STA} of each data packet of the STA successfully demodulated, and calculates the path loss between each STA and the AP (here it is assumed that the uplink path loss and the downlink path loss are symmetrical). It is required to estimate the uplink transmission power of the STA when the path loss data are calculated (if the calculation is performed according to the maximum transmission power, generally the mobile phone is of 17 dBm, and the portable computer is of 20 dBm).

With the help of the path loss data between the APs and AP-STA, the system can acquire the interference relationships between the communication pairs. In the embodiment of the present document, it is assumed that both the AP1 and the STA1 transmit with the maximum power, based on:

1) the path loss between the AP1 and the AP2;
2) the path loss between the AP1 and the STA2;
3) the path loss between the AP2 and the STA1;
it is to calculate:
1) calculating an interference value RSSI_aa12 from the first AP to the second AP according to an expression below:

$$RSSI\_aa12 = TxPower_{AP_1} - PathLoss_{AP_1 AP_2},$$

wherein $TxPower_{AP_1}$ is the transmission power of the first AP, and $PathLoss_{AP_1 AP_2}$ is the path loss data between the first AP and the second AP;

$$TxPower_{AP_1} - PathLoss_{AP_1 AP_2};$$

2) calculating an interference value RSSI_as12 from the first AP to the second client according to an expression below:

$$RSSI\_as12 = TxPower_{AP_1} - PathLoss_{AP_1 STA_2},$$

wherein, $PathLoss_{AP_1 STA_2}$ is the path loss data between the first AP and the second client;

$$TxPower_{AP_1} - PathLoss_{AP_1 STA_2};$$

3) calculating an interference value RSSI_sa12 from the first client to the second AP according to an expression below:

$$RSSI\_sa12 = TxPower_{STA_1} - PathLoss_{AP_2 STA_1},$$

wherein $TxPower_{STA_1}$ is the transmission power of the first client, $PathLoss_{AP_2 STA_1}$ is the path loss between the second AP and the first client;

$$TxPower_{STA_1} - PathLoss_{AP_2 STA_1};$$

wherein $TxPower_{AP_1}$ is the transmission power of the first AP, and $TxPower_{STA_1}$ is the transmission power of the STA1, $PathLoss_{AP_1 STA_2}$ is the path loss from the AP1 to the STA2, $PathLoss_{AP_1 AP_2}$ is the path loss from the AP1 to the AP2, and $PathLoss_{AP_2 STA_1}$ is the path loss from the AP2 to the STA1.

4) comparing the RSSI_aa12, RSSI_as12 and RSSI_sa12 with an interference threshold value preset for the second AP and the second client;

the RSSI_aa12, RSSI_as12 and RSSI_sa12 are compared with the interference threshold value preset for the AP2 and the STA2, and when the RSSI_aa12 and/or the RSSI_sa12 exceeds the interference threshold value, it is determined that an interference exists.

Correspondingly, if the RSSI_aa12 or RSSI_sa12 exceeds the threshold, it is considered that the AP1 or STA1 will interfere with the AP2, and if the RSSI_as12 exceeds the threshold, it is considered that the AP1 will interfere with the STA2.

Similarly, when the AP2 and the STA2 need to communicate, the measurement can be made according to the same method, and the steps are as follows:

it is to calculate:
1) RSSI_aa21 of the signal of the AP2 reaching the AP1;
2) RSSI_as21 of the signal of the AP2 reaching the STA1;
3) RSSI_sa21 of the signal of the STA2 reaching the AP1;
and it is to judge whether the AP2 or STA2 will interfere with the AP1, and whether the AP2 will interfere with the STA1.

According to the 802.11 protocol, the path loss between the STA1 and the STA 2 cannot be acquired yet at present, but the interference relationship between the STA1 and the STA 2 can be indirectly evaluated with the help of the response of the STA1 to RTS and CTS signals of the STA2. For example, the AC can decide that the STA2 starts to accept data when the STA1 sends the uplink data, and make the AP2 send the RTS to the STA2, if the STA2 does not reply with the CTS, it indicates that the STA1 interferes with the STA2, resulting in that the STA2 does not correctly receive the RTS sent by the AP2.

After the interference relationships between various devices are evaluated, an interference matrix between different communication pairs shown in Table 1 is obtained, wherein, the row indicates receiving parties of the signal, and the column indicates sending parties of the signal.

TABLE 1

| Destination | Source | | | |
|---|---|---|---|---|
| | AP1 | STA1 | AP2 | STA2 |
| AP1 | / | / | Interference/ noninterference | Interference/ noninterference |
| STA1 | / | / | Interference/ noninterference | Interference/ noninterference |
| AP2 | Interference/ noninterference | Interference/ noninterference | / | / |
| STA2 | Interference/ noninterference | Interference/ noninterference | / | / |

The embodiment 3 of the present document will be described in combination with the accompanying drawings.

The embodiment of the present document provides a data transmission scheduling method, with this method, when the data scheduling is performed, firstly a measurement report sent by an AP is received, the measurement report carries the transmission power of the AP sending the measurement report, and signal reception levels and powers of surrounding devices of the AP, then according to the measurement report, interference relationships between the AP and the surrounding devices of the AP are evaluated, an evaluation result is obtained, and a scheduling decision is made according to the evaluation result of the interference relationships. For details, it may refer to the embodiment 1 of the present document.

In the embodiment of the present document, it is to focus on the interference evaluation way in a scenario of multiple communication pairs (three or more than three communication pairs).

When the system has a plurality of communication pairs, since interferences of the plurality of communication pairs can be accumulated, the scheduling way is different from that for the two communication pairs. Firstly, interference relationships between various communication pairs containing a neighboring AP of the first AP and the first communication pair are respectively evaluated, then the interference relationships of various communication pairs containing the neighboring AP with the first communication pair are accumulated, thus the total interference of all communication pairs containing the neighboring AP with the first communication pair can be obtained.

Figure 8:
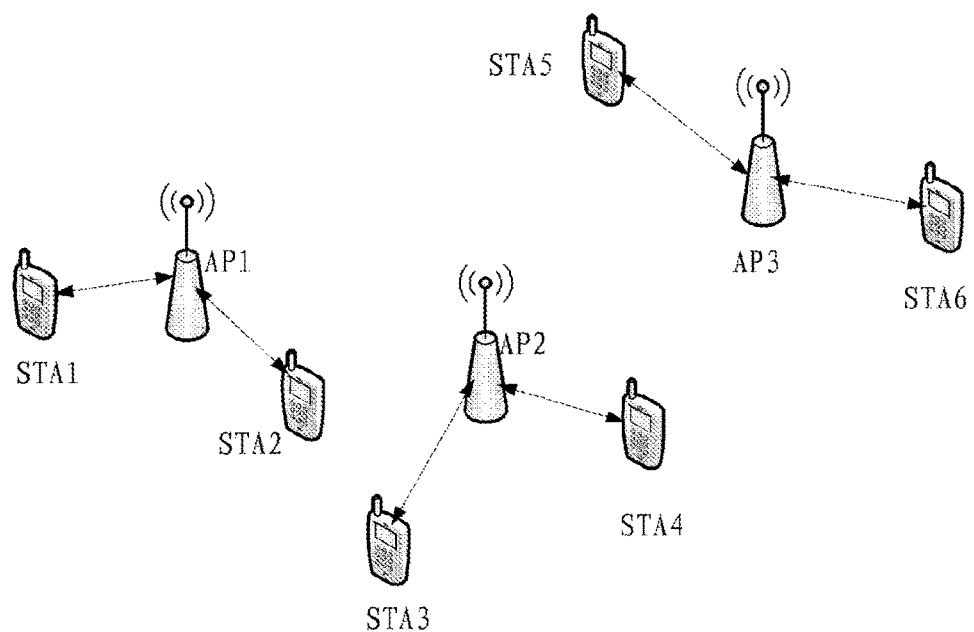
FIG. 8 is a schematic diagram of a network structure containing a plurality of AP-STA communication pairs.

The data transmission scheduling method provided in the embodiment of the present document is introduced by taking the system shown in FIG. 8 as an example, wherein nine devices AP1~3 and STA1~6 are contained, and six communication pairs AP1-STA1~2, AP2-STA3~4 and AP3-STA5~6 are formed. The descriptions will be made by taking the example of the AP1 being the first AP and the STA1 being the first client.

Firstly the system is required to obtain the path losses between various devices, and the method is the same as that in the embodiment 2 of the present document, which will not be repeated. The interference relationships between each two of various communication pairs can be evaluated according to the path losses between the devices, the interference of the AP1-STA1 to the AP2-STA3 is taken as an example, and the calculation process is as follows:

firstly based on:
1) the path loss between the AP1 and the STA1;
2) the path loss between the AP1 and the AP2;
3) the path loss between the AP1 and the STA3;
4) the path loss between the AP2 and the STA1;
5) the path loss between the AP2 and the STA3;

it can calculate:
1) the level RSSI_as11 of the signal of the AP1 reaching the STA1;
2) the level RSSI_aa12 of the signal of the AP1 reaching the AP2;
3) the level RSSI_as13 of the signal of the AP1 reaching the STA3;
4) the level RSSI_sa12 of the signal of the STA1 reaching the AP2;
5) the level RSSI_sa11 of the signal of the STA1 reaching the AP1;
6) the level RSSI_as23 of the signal of the AP2 reaching the STA3;
7) the level RSSI_aa21 of the signal of the AP2 reaching the AP1;
8) the level RSSI_as21 of the signal of the AP2 reaching the STA1;
9) the level RSSI_sa31 of the signal of the STA3 reaching the AP1;
10) the level RSSI_sa32 of the signal of the STA3 reaching the AP2.

Then the interference degree of the AP1-STA1 to the AP2-STA3 can be calculated according to the following expression:

$$\Phi_{AP_1 \to STA_1}^{AP_2 \to STA_2} = P_{AP_1}^{AP_2} \cdot \alpha \cdot (\Delta_{AP_1}^{AP_2 \to STA_3} + \Delta_{STA_1}^{STA_3 \to AP_2}) + (1 - P_{AP_1}^{AP_2}) \cdot (\Delta_{AP_1}^{AP_2 \to STA_3} + \Delta_{STA_1}^{STA_3 \to AP_2} + \Delta_{AP_1}^{STA_3 \to AP_2});$$

wherein:
1. if RSSI_aa12≥CCAThreshlod (indicating that the AP2 can sense the signal of the AP1), $P_{AP_1}^{AP_2}=1$; otherwise $P_{AP_1}^{AP_2}=0$ (indicating that the AP2 cannot sense the signal of the AP1, and the STA3 can sense the signal of the AP1).
2. α indicates a probability of simultaneously sending the data packets, and it represents a collision opportunity of downlink data packets of the AP1 and the AP2;
3. $\Delta_{AP_1}^{AP_2 \to STA_3}$ indicates the influence of the AP1 on a reception signal to noise ratio of the AP2→STA3 communication pair, and the values are as shown in Table 2.

TABLE 2

| Signal and interference power difference | $\Delta_{AP_1}^{AP_2 \to STA_3}$ |
|---|---|
| 25 ≤ RSSI_as23-RSSI_as13 | 0 |
| 20 ≤ RSSI_as23-RSSI_as13 < 25 | 0.2 |
| 15 ≤ RSSI_as23-RSSI_as13 < 20 | 0.4 |
| 10 ≤ RSSI_as23-RSSI_as13 < 15 | 0.7 |
| 5 ≤ RSSI_as23-RSSI_as13 < 10 | 1 |
| 0 ≤ RSSI_as23-RSSI_as13 < 5 | 2 |
| RSSI_as23-RSSI_as13 < 0 | 4 |

4. $\Delta_{STA_1}^{STA_3 \to AP_2}$ indicates the influence of the STA1 on a reception signal to noise ratio of the STA3→AP2 communication pair (downlink data ACK), and the values are as shown in Table 3.

TABLE 3

| Signal and interference power difference | $\Delta_{STA_1}^{STA_3 \to AP_2}$ |
|---|---|
| 15 ≤ RSSI_sa32-RSSI_sa12 | 0 |
| 10 ≤ RSSI_sa32-RSSI_sa12 < 15 | 0.5 |
| 5 ≤ RSSI_sa32-RSSI_sa12 < 10 | 1 |
| 0 ≤ RSSI_sa32-RSSI_sa12 < 5 | 2 |
| RSSI_sa32-RSSI_sa12 < 0 | 4 |

5. $\Delta_{AP_1}^{STA_3 \to AP_2}$ indicates the influence of the AP1 on a reception signal to noise ratio of the STA3→AP2 communication pair (downlink data ACK), and the values are as shown in Table 4.

$\Delta_{AP_1}^{STA_3 \to AP_2}$

TABLE 4

| Signal and interference power difference | $\Delta_{AP_1}^{STA_3 \to AP_2}$ |
|---|---|
| 15 ≤ RSSI_sa32-RSSI_aa12 | 0 |
| 10 ≤ RSSI_sa32-RSSI_aa12 < 15 | 0.5 |
| 5 ≤ RSSI_sa32-RSSI_aa12 < 10 | 1 |
| 0 ≤ RSSI_sa32-RSSI_aa12 < 5 | 2 |
| RSSI_sa32-RSSI_aa12 < 0 | 4 |

If any factor of the $\Delta_{AP_1}^{AP_2 \to STA_3}$, $\Delta_{STA_1}^{STA_3 \to AP_2}$ and $\Delta_{AP_1}^{STA_3 \to AP_2}$ in the above expressions cannot be calculated for there is no path loss data of the related devices, the factor is ignored.

The interference of the AP1→STA1 with the AP2→STA2 is calculated above, the total interference of the AP1 with the AP2 can be calculated through the following expression:

$$\Phi_{AP_1}^{AP_2} = \sum_{STA_i \in U_{AP_1}} \sum_{STA_j \in U_{AP_2}} \Phi_{AP_1 \to STA_i}^{AP_2 \to STA_j}$$

wherein $U_{AP_1}$ represents a served STA set of the AP1, and $U_{AP_2}$ represents a served STA set of the AP2.

The total interference of the AP1 with the neighboring APs also can be obtained:

$$P_I^{AP_1} = \sum_{AP_j \in Neigh_{AP_1}} \Phi_{AP_1}^{AP_j} = \sum_{AP_j \in Neigh_{AP_1}} \sum_{STA_k \in U_{AP_1}} \sum_{STA_i \in U_{AP_j}} \Phi_{AP_1 \to STA_k}^{AP_j \to STA_i}$$

wherein $Neigh_{AP_1}$ represents a neighboring AP set of the AP1 (namely an AP set that the AP1 has reported the measurement report).

Similarly, the total interference of the communication pair containing the neighboring APs with the communication pair AP1→STA1 also can be obtained:

$$P_{II}^{AP_1} = \sum_{AP_j \in Neigh_{AP_1}} \Phi_{AP_j}^{AP_1} = \sum_{AP_j \in Neigh_{AP_1}} \sum_{STA_k \in U_{AP_1}} \sum_{STA_i \in U_{AP_j}} \Phi_{AP_j \to STA_k}^{AP_1 \to STA_i}$$

It should be noted that FIG. 8 is just one specific implementation for the scenario of multiple communication pairs, in the actual application process, there are various different scenarios of multiple communication pairs. With regard to any scenario of multiple communication pairs, when the interference with any one communication pair is evaluated, the implementation principle thereof is the same as the embodiment of the present document, that is, the interferences of all other communication pairs with the communication pair are accumulated.

After completing the evaluation of the interference relationships between the various communication pairs according to the collected measurement reports, the system is required to make a scheduling decision on the transmission of data packets in the network, the embodiment of the present document proposes three scheduling decision schemes: scheduling k packets by k packets, scheduling based on allocating time slices according to the APs and scheduling based on allocating time slices according to the STAs, which will be respectively described below.

The embodiment 4 of the present document will be described below.

The embodiment of the present document provides a data transmission scheduling method, with this method, when the data scheduling is performed, firstly a measurement report sent by an AP is received, the measurement report carries the transmission power of the AP sending the measurement report, and signal reception levels and powers of surrounding devices of the AP, then according to the measurement report, interference relationships between the AP and the surrounding devices of the AP are evaluated, an evaluation result is obtained, and a scheduling decision is made according to the evaluation result of the interference relationships.

On the basis of evaluating the interference relationships based on the embodiment 2 and embodiment 3 of the present document, the flow of making the scheduling decision by means of scheduling packet by packet is described as follows:

1. firstly the system monitors all downlink data packets, the AC takes charge in the centralized network, and the APs take charge in the distributed network;
2. when there are downlink data packets to be sent, the following decision is made:
  when two communication pairs request for simultaneously transmitting downlink data packets, it is to judge whether the following four conditions are met, and when the following four conditions are simultaneously met, determine that the two communication pairs can simultaneously transmit the downlink data packets:
  when the first AP sends data to the first client, the second AP and the second client cannot interfere with the first client,
  when the second AP and the second client interfere with the first AP, the interference is stopped before the first client sends the ACK;
  when the second AP sends data to the second client, the first AP and the first client cannot interfere with the second client; and
  when the first AP and the first client interfere with the second AP, the interference is stopped before the second client sends the ACK.

Correspondingly, if there are two communication pairs AP1-STA1 and AP2-STA2, when the following conditions are simultaneously met, the AP1-STA1 and AP2-STA2 can work simultaneously:
  1) when the AP1 sends data to the STA1, the AP2 and the STA2 cannot interfere with the STA1, but the AP2 and the STA2 can interfere with the AP1, but the interference must be stopped before the STA1 sends the ACK;

2) when the AP2 sends data to the STA2, the AP1 and the STA1 cannot interfere with the STA2, but the AP1 and the STA1 can interfere with the AP2, but the interference must be stopped before the STA2 sends the ACK;

when three or more than three communication pairs request for simultaneously transmitting downlink data packets, it is to judge whether the following two conditions are met, and when the following two conditions are simultaneously met, determine that the three or more than three communication pairs can simultaneously transmit the downlink data packets:

an interference of any communication pair with another communication pair is less than a set threshold, and an interference with any communication pair is less than a set threshold.

Correspondingly, these communication pairs can simultaneously send the data when the following conditions are simultaneously met:

1) the interference of any communication pair with another communication pairs is less than a set threshold;
2) the interference with any communication pair is less than a set threshold.

Figure 9:
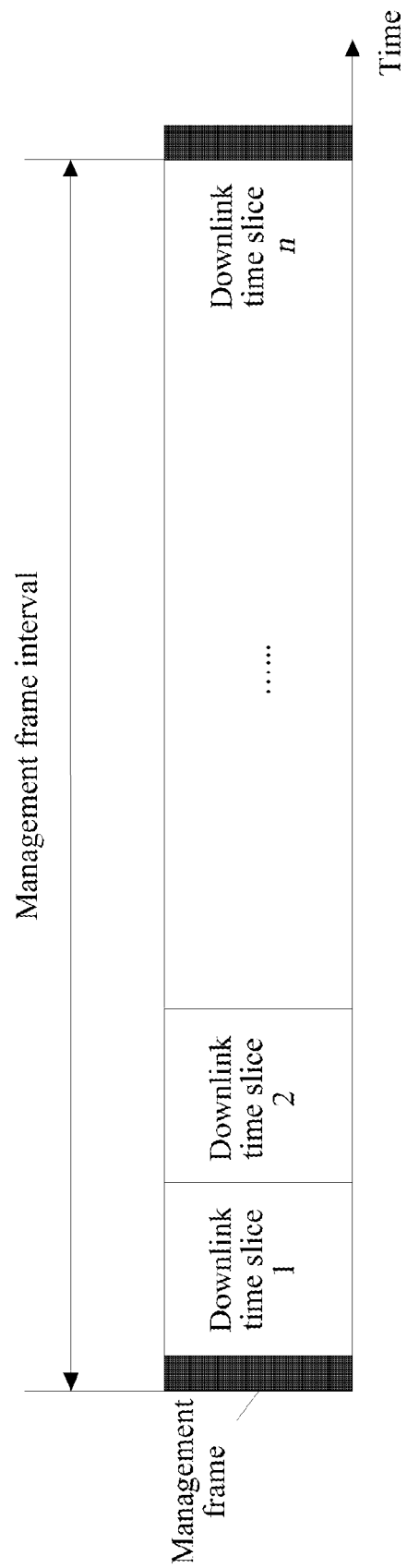
FIG. 9 is a schematic diagram of the time slice resource.
Figure 10:
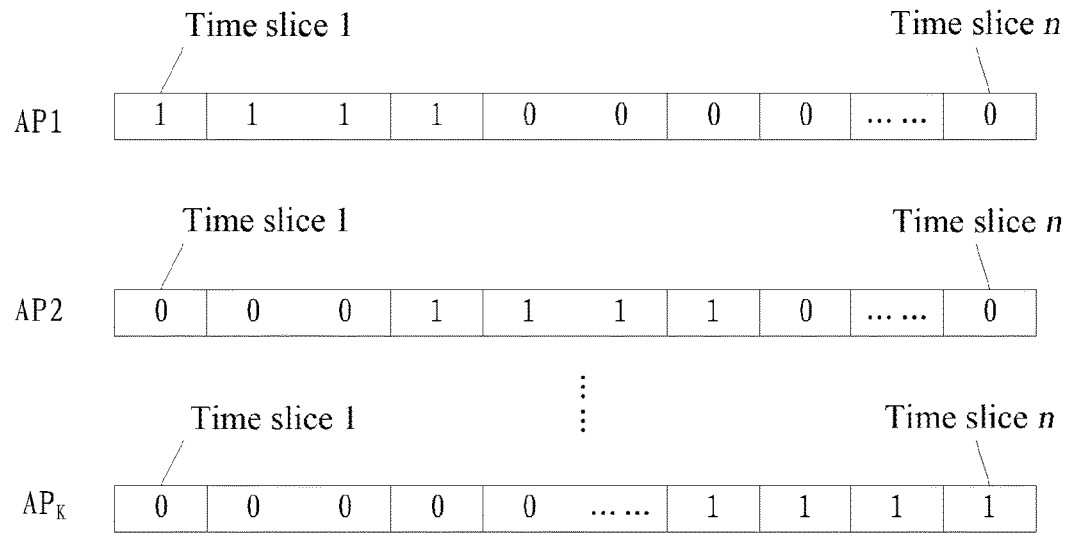
FIG. 10 is a schematic diagram of dividing bitmap information of time slices according to the APs.

On the basis of evaluating the interference relationships based on the embodiment 2 and embodiment 3 of the present document, the flow of making the decision based on allocating time slices according to the APs is described as follows:

1) time resource of a time interval of a Beacon frame of at least one AP is divided into a plurality of time slices. As shown in FIG. 9, each AP divides the time interval of its own Beacon frame into n time slices (time resource of a plurality of Beacon frame intervals also can be combined to divide).
2. different time slices are orderly allocated for each AP according to a sequence from large to small sums of interferences to other APs and interferences from other APs of each AP, wherein APs which interferes with each other is not allocated with a same time slice, and a plurality of APs which doesn't interfere with each other is allocated in a same time slice. Correspondingly, the system orderly allocates different time slices for the APs according to a sequence from large to small of sums of interferences with others and interferences from others, and a same time slice is not allocated to the APs in which the interference exists in principle. Alternatively, a priority can be configured for each AP in the network, and when the time slices are allocated to the APs between which the interference exists, time slices are preferentially allocated to an AP with a higher priority.
3. after the time slices are allocated, an AC or an AP responsible for the decision outputs scheduling decision information to each AP, wherein the scheduling decision information contains bitmap information of the time slices of each AP, to indicate each AP to compete for a channel in the allocated time slices, and after the channel is obtained by competition, fill downlink data into a buffer of a physical layer. Each AP then outputs its own bitmap information of the time slices, as shown in FIG. 10. Wherein, on a time slice whose corresponding location in the bitmap is 1, if the channel is obtained by competition, the AP fills the downlink data into the Buffer of the physical layer (sending to which STA specifically is decided according to any related scheduling way, such as polling and proportional fairness and so on), thereby implementing multiplexing of the downlink data in a time domain.

Figure 11:
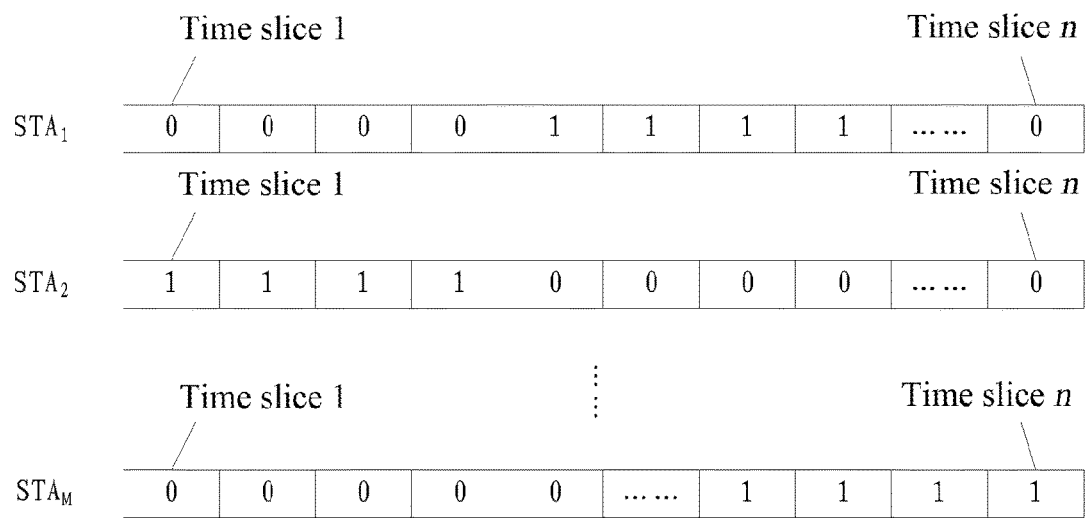
FIG. 11 is a schematic diagram of dividing bitmap information of time slices according to the STAs.

On the basis of evaluating the interference relationships based on the embodiment 2 and embodiment 3 of the present document, the flow of making the decision based on allocating time slices according to the STAs is described as follows:

1) similar to the scheme of allocating the time slices according to the APs, each AP divides the time interval of its own Beacon frame into n time slices (time resource of a plurality of Beacon frame intervals also can be combined to divide);
2. each AP allocates n/M time slices for each associated client under the AP, and a principle for allocating the time slices includes: the client being a client with a minimum sum of an interference with another client and an interference from another client on the time slices, wherein, M represents the number of associated clients of the AP, and n represents the number of time slices. Correspondingly, the AP allocates n/M time slices for each associated STA, M represents the number of associated STAs of the AP, and a principle for allocating the time slices includes: the STA being an associated STA with a minimum sum of an interference with another and an interference from another on the time slices.
3. after the time slices are allocated to all associated STAs, an AC or an AP responsible for the decision outputs scheduling decision information to each AP, wherein the scheduling decision information contains bitmap information of the time slices of each associated client under each AP, and it is to compete for the physical channel. Each AP then outputs the bitmap information of the time slices of each associated STA, as shown in FIG. 11. Wherein, on a time slice whose corresponding location in the bitmap is 1, after the physical channel is obtained by competition, the AP fills the downlink data of which a destination address is the STA into a Buffer of the physical layer, thereby implementing multiplexing of the downlink data in a time domain.

The embodiment 5 of the present document will be described in combination with the accompanying drawings.

Figure 12:
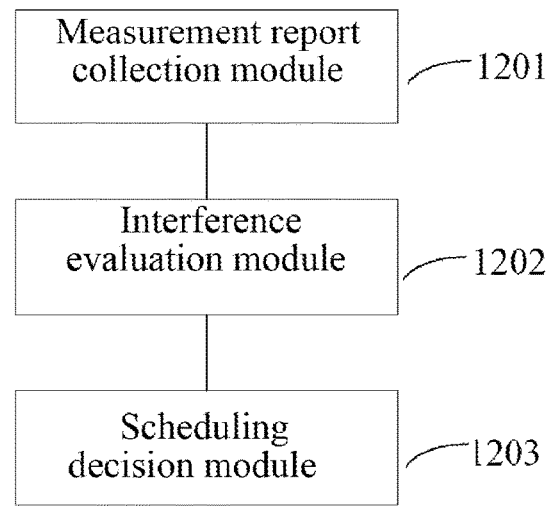
FIG. 12 is a schematic diagram of a structure of a data transmission scheduling device provided in the embodiment 5 of the present document.

The embodiment of the present document provides a data transmission scheduling device, and a structure of the device is as shown in FIG. 12 and it includes: a measurement report collection module 1201, an interference evaluation module 1202 and a scheduling decision module 1203, wherein, the measurement report collection module 1201 is configured to: receive a measurement report sent by an AP, wherein the measurement report carries a transmission power of the AP sending the measurement report, and signal reception levels and powers of surrounding devices of the AP;

the interference evaluation module 1202 is configured to: according to the measurement report, evaluate interference relationships between the AP and the surrounding devices of the AP, and obtain an evaluation result; and the scheduling decision module 1203 is configured to: make a scheduling decision according to the evaluation result.

Figure 13:
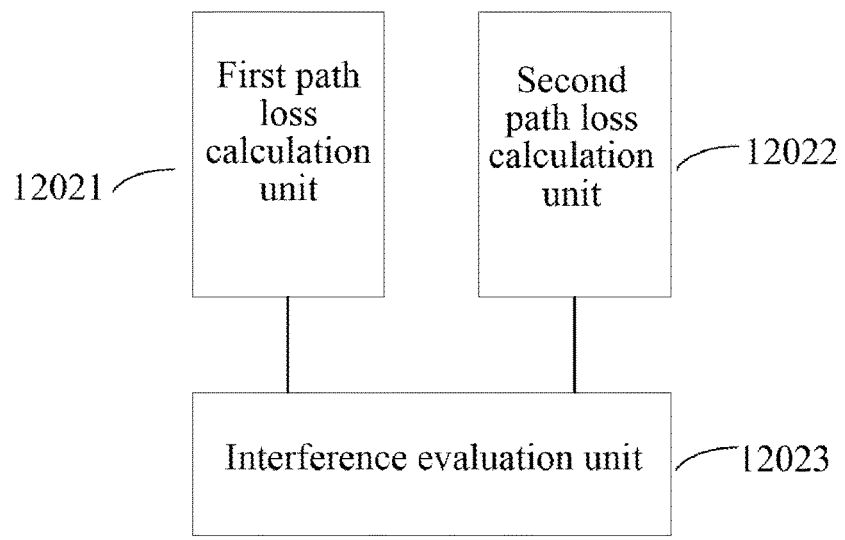
FIG. 13 is a schematic diagram of a structure of an interference evaluation module 1202 in FIG. 12.

Alternatively, a structure of the interference evaluation module 1202 is as shown in FIG. 13 and it includes:

a first path loss calculation unit 12021, configured to: calculate path loss data between the APs;

a second path loss calculation unit 12022, configured to: establish path loss data between an AP and a client accessing under the AP; and an interference evaluation unit 12023, configured to: according to the path loss data between the APs and the path loss data between the AP and the client accessing under the AP, evaluate interference relationships between all devices in one communication pair and all devices in another communication pair, wherein, the communication pair is composed of communications between the AP and the client accessing under the AP.

Alternatively, the device also includes:

a result output module 1204, configured to: output scheduling decision information, wherein the scheduling decision information contains bitmap information of time slices of each AP, indicate each AP to compete for a channel in allocated time slices, and after the channel is obtained by competition, fill downlink data into a buffer of a physical layer.

The above data transmission scheduling system can be integrated in the AC or AP, and the AC or AP completes corresponding functions. When it is integrated in the AC, each AP sends the measurement report to the AC; and when it is integrated in the AP, the AP collects the measurement reports broadcasted by other APs.

The embodiment of the present document also provides a data transmission scheduling system, which includes the above data transmission scheduling device and at least one AP;

the data transmission scheduling device is configured to: receive a measurement report sent by the AP, wherein the measurement report carries a transmission power of the AP sending the measurement report, and signal reception levels and powers of surrounding devices of the AP, according to the measurement report, evaluate interference relationships between the AP and the surrounding devices of the AP, obtain an evaluation result, and make a scheduling decision according to the evaluation result.

Alternatively, the data transmission scheduling device is further configured to: output scheduling decision information, wherein the scheduling decision information contains bitmap information of time slices of each AP, indicate each AP to compete for a channel in allocated time slices, and after the channel is obtained by competition, fill downlink data into a buffer of a physical layer.

Alternatively, the AP is configured to: send the measurement report of the AP to the data transmission scheduling device, or, broadcast the measurement report of the AP.

Alternatively, the AP is further configured to: record received data packet signal levels of various clients and/or a neighboring AP.

The embodiments of the present document provide a data transmission scheduling method, device and system, the data transmission scheduling device receives a measurement report sent by an AP, wherein the measurement report carries a transmission power of the AP sending the measurement report, and signal reception levels and powers of surrounding devices of the AP, then according to the measurement report, it evaluates interference relationships between the AP and the surrounding devices of the AP, obtains an evaluation result, and then makes a scheduling decision according to the evaluation result, which implements parallel communication of a plurality of low-interference terminals, and solves the problem of low network utilization rate in the related scheduling modes.

The ordinary person skilled in the art can understand that all or part of steps of the above embodiments can be implemented by using a flow of computer program, and the computer program can be stored in a computer readable memory medium, and the computer program is executed on corresponding hardware platforms (such as a system, equipment, device and component and so on), and when the program is carried out, one of the steps or a combination of the steps of the method embodiments is included.

Alternatively, all or part of the steps of the above embodiments also can be implemented by using integrated circuits, these steps can be made into multiple integrated circuit modules respectively or multiple modules or steps of them can be made into a single integrated circuit module to be implemented. Therefore, the present document is not limited to any combination of hardware and software in a specific form.

The devices or function modules or function units in the above embodiments can be implemented through a universal calculating device, and they can be concentrated on a single calculating device or distributed in a network consisting of multiple calculating devices.

If implemented in a form of software function module and sold or used as an independent product, the devices or function modules or function units in the above embodiments can be stored in a computer readable memory medium. The computer readable memory medium mentioned above can be a read-only memory, magnetic disk or optical disk and so on.

Any skilled people familiar with the art can easily conceive changes or substitutions within the technical scope disclosed by the present document, and these changes and substitutions shall be all covered within the protection scope of the present document. Therefore, the protection scope of the present document should be subject to the protection scope described in the claims.

INDUSTRIAL APPLICABILITY

In the embodiments of the present document, parallel communication of a plurality of low-interference terminals is implemented, and the problem of low network utilization rate in the related scheduling modes is solved. Therefore, it has very strong industrial applicability.

What is claimed is:

1. A data transmission scheduling method, comprising:
receiving a measurement report sent by an access point (AP), wherein the measurement report carries a transmission power of the AP sending the measurement report, and signal reception levels and powers of surrounding devices of the AP;
evaluating interference relationships between the AP and the surrounding devices of the AP according to the measurement report, and obtaining an evaluation result; and
making a scheduling decision according to the evaluation result.

2. The data transmission scheduling method according to claim 1, wherein, the step of evaluating interference relationships between the AP and the surrounding devices of the AP according to the measurement report comprises:
according to the measurement report, calculating path loss data between the APs;
according to the measurement report, calculating path loss data between an AP and a client accessing under the AP; and
evaluating interference relationships between all devices in one communication pair and all devices in another communication pair according to the path loss data between the APs and the path loss data between the AP and the client accessing under the AP;

wherein, the communication pair is composed of communications between the AP and the client accessing under the AP.

3. The data transmission scheduling method according to claim 2, wherein, when only two communication pairs exist, a first AP and a first client form one communication pair, a second AP and a second client form the other communication pair, the step of evaluating interference relationships between all devices in one communication pair and all devices in another communication pair according to the path loss data between the APs and the path loss data between the AP and the client accessing under the AP comprises:

calculating an interference value RSSI_aa12 from the first AP to the second AP according to an expression below:

$$RSSI\_aa12 = TxPower_{AP_1} - PathLoss_{AP_1 AP_2},$$

wherein, $TxPower_{AP_1}$ is a transmission power of the first AP, and $PathLoss_{AP_1 AP_2}$ is path loss data between the first AP and the second AP;

calculating an interference value RSSI_as12 from the first AP to the second client according to an expression below:

$$RSSI\_as12 = TxPower_{AP_1} - PathLoss_{AP_1 STA_2},$$

wherein, $PathLoss_{AP_1 STA_2}$ is path loss data between the first AP and the second client;

calculating an interference value RSSI_sa12 from the first client to the second AP according to an expression below:

$$RSSI\_sa12 = TxPower_{STA_1} - PathLoss_{AP_2 STA_1},$$

wherein, $TxPower_{STA_1}$ is a transmission power of the first client, $PathLoss_{AP_2 STA_1}$ is path loss between the second AP and the first client;

comparing the RSSI_aa12, RSSI_as12 and RSSI_sa12 with an interference threshold value preset for the second AP and the second client; and when the RSSI_aa12, RSSI_as12 and/or the RSSI_sa12 exceeds the interference threshold value, determining that an interference exists.

4. The data transmission scheduling method according to claim 2, wherein, when three or more than three communication pairs exist, a first AP and a first client form a first communication pair, the step of evaluating interference relationships between all devices in one communication pair and all devices in another communication pair according to the path loss data between the APs and the path loss data between the AP and the client accessing under the AP comprises:

respectively evaluating interference relationships between various communication pairs containing a neighboring AP of the first AP and the first communication pair; and performing accumulation on the interference relationships of the various communication pairs containing the neighboring AP with the first communication pair, and obtaining a total interference of all communication pairs containing the neighboring AP with the first communication pair.

5. The data transmission scheduling method according to claim 3, wherein, the step of making a scheduling decision according to the evaluation result comprises:

when two communication pairs request for simultaneously transmitting downlink data packets, judging whether the following four conditions are met, when the following four conditions are simultaneously met, determining that the two communication pairs can simultaneously transmit the downlink data packets:

when the first AP sends data to the first client, the second AP and the second client cannot interfere with the first client;

when the second AP and the second client interfere with the first AP, the interference is stopped before the first client sends downlink data ACK;

when the second AP sends data to the second client, the first AP and the first client cannot interfere with the second client; and when the first AP and the first client interfere with the second AP, the interference is stopped before the second client sends the ACK.

6. The data transmission scheduling method according to claim 4, wherein, the step of making a scheduling decision according to the evaluation result comprises:

when three or more than three communication pairs request for simultaneously transmitting downlink data packets, judging whether the following two conditions are met, when the following two conditions are simultaneously met, determining that the three or more than three communication pairs can simultaneously transmit the downlink data packets:

an interference of any communication pair with another communication pair is less than a set threshold; and an interference with any communication pair is less than a set threshold.

7. The data transmission scheduling method according to claim 1, wherein, the step of making a scheduling decision according to the evaluation result comprises:

dividing time resource of a time interval of a management frame Beacon frame of at least one AP into a plurality of time slices;

orderly allocating different time slices for each AP according to a sequence from large to small sums of interferences to other APs and interferences from other APs of each AP, wherein APs which interferes with each other is not allocated with a same time slice, and a plurality of APs which doesn't interfere with each other is allowed in a same time slice.

8. The data transmission scheduling method according to claim 7, wherein, when time slices are allocated to the APs between which the interference exists, time slices are preferentially allocated to an AP with a higher priority.

9. The data transmission scheduling method according to claim 8, further comprising:

configuring a priority for each AP in a network.

10. The data transmission scheduling method according to claim 7, wherein after the step of making a scheduling decision according to the evaluation result, the method further comprises:

outputting scheduling decision information, wherein the scheduling decision information contains bitmap information of time slices of each AP, indicating each AP to compete for a channel in allocated time slices, and after the channel is obtained by competition, filling downlink data into a buffer of a physical layer.

11. The data transmission scheduling method according to claim 1, wherein, the step of making a scheduling decision according to the evaluation result comprises:

dividing time resource of a time interval of a Beacon frame of at least one AP into a plurality of time slices;

each AP allocating n/M time slices for each associated client under the AP, wherein a principle for allocating the time slices comprises: the client being a client in the time slices with a minimum sum of an interference to another client and an interference from another client, wherein, M represents a number of associated clients of the AP, and n represents a number of time slices, wherein, M and n are positive integers.

12. The data transmission scheduling method according to claim 11, wherein after the step of making a scheduling decision according to the evaluation result, the method further comprises:
outputting scheduling decision information, wherein the scheduling decision information contains bitmap information of time slices of each associated client under each AP, indicating the AP to compete for a physical channel; and
after the AP obtains the physical channel by competition, filling downlink data of which a destination address is a corresponding client of time slices into a buffer of a physical layer.

13. The data transmission scheduling method according to claim 1, wherein, the step of receiving a measurement report sent by an AP comprises:
an access controller AC receiving a measurement report of the AP sent by each AP.

14. The data transmission scheduling method according to claim 1, wherein, the step of receiving a measurement report sent by an AP comprises:
the AP receiving measurement reports of other APs except the AP broadcasted by the other APs.

15. The data transmission scheduling method according to claim 4, further comprising:
the AP recording received data packet signal levels of various clients and/or a neighboring AP.

16. The data transmission scheduling method according to claim 14, further comprising:
the AP broadcasting a measurement report of the AP itself, wherein, the measurement report carries a transmission power of the first AP sending the measurement report, and signal reception levels and powers of surrounding devices of the AP.

17. A data scheduling device, comprising: a measurement report collection module, an interference evaluation module and a scheduling decision module, wherein,
the measurement report collection module is configured to: receive a measurement report sent by an access point (AP), wherein the measurement report carries a transmission power of the AP sending the measurement report, and signal reception levels and powers of surrounding devices of the AP;
the interference evaluation module is configured to: according to the measurement report, evaluate interference relationships between the AP and the surrounding devices of the AP, and obtain an evaluation result; and
the scheduling decision module is configured to: make a scheduling decision according to the evaluation result.

18. The data transmission scheduling device according to claim 17, wherein, the interference evaluation module comprises:
a first path loss calculation unit, configured to: calculate path loss data between the APs according to the measurement report;
a second path loss calculation unit, configured to: calculate path loss data between an AP and a client accessing under the AP according the measurement report, calculating; and
an interference evaluation unit, configured to: according to the path loss data between the APs and the path loss data between the AP and the client accessing under the AP, evaluate interference relationships between all devices in one communication pair and all devices in another communication pair;
wherein, the communication pair is composed of communications between the AP and the client accessing under the AP, or,
the data transmission scheduling device further comprises:
a result output module, configured to: output scheduling decision information, wherein the scheduling decision information contains bitmap information of time slices of each AP, indicate each AP to compete for a channel in allocated time slices, and after the channel is obtained by competition, fill downlink data into a buffer of a physical layer.

19. A data transmission scheduling system, comprising a data transmission scheduling device and at least one access point (AP);
the data transmission scheduling device is configured to: receive a measurement report sent by the AP, wherein the measurement report carries a transmission power of the AP sending the measurement report, and signal reception levels and powers of surrounding devices of the AP, according to the measurement report, evaluate interference relationships between the AP and the surrounding devices of the AP, obtain an evaluation result, and make a scheduling decision according to the evaluation result.

20. The data transmission scheduling system according to claim 19, wherein,
the data transmission scheduling device is further configured to: output scheduling decision information, wherein the scheduling decision information contains bitmap information of time slices of each AP, indicate each AP to compete for a channel in allocated time slices, and after the channel is obtained by competition, fill downlink data into a buffer of a physical layer, or, wherein,
the AP is configured to: send the measurement report of the AP to the data transmission scheduling device, or, broadcast the measurement report of the AP, or, wherein,
the AP is further configured to: record received data packet signal levels of various clients and/or a neighboring AP.

* * * * *